United States Patent [19]
Taylor

[11] 4,013,090
[45] * Mar. 22, 1977

[54] GATE VALVE ROTATING DISC

[76] Inventor: Julian S. Taylor, 8300 SW. 8, Oklahoma City, Okla. 73108

[ * ] Notice: The portion of the term of this patent subsequent to Mar. 18, 1992, has been disclaimed.

[22] Filed: Nov. 10, 1975

[21] Appl. No.: 630,554

[52] U.S. Cl. .......................... 137/329.05; 251/230; 251/326

[51] Int. Cl.² ......................................... F16K 43/00

[58] Field of Search ...................... 137/329.05, 330; 251/230, 326, 327, 328

[56] References Cited

UNITED STATES PATENTS

| | | | |
|---|---|---|---|
| 2,977,975 | 4/1961 | Allen | 137/330 |
| 2,977,976 | 4/1961 | Allen | 137/330 |
| 2,977,977 | 4/1961 | Pennington | 137/330 |
| 3,472,271 | 10/1969 | Allen | 137/329.05 |
| 3,614,061 | 10/1971 | Fitzpatrick | 251/328 |
| 3,871,616 | 3/1975 | Taylor | 251/328 |

Primary Examiner—Martin P. Schwadron
Assistant Examiner—G. L. Walton
Attorney, Agent, or Firm—Robert K. Rhea

[57] ABSTRACT

A gate valve having a flow passage therethrough is provided with a valve stem movable disc having an opening permitting fluid flow through the passageway when in register therewith and interrupting fluid flow when the disc is in a valve closed position. The disc is provided with a removable cylindrical plug mating with ring-like seats on opposite sides of the disc surrounding and coaxial with the flow passageway. Ratchet teeth on the plug engage a detent to rotate it through a predetermined arc each time the gate valve is closed.

3 Claims, 5 Drawing Figures

GATE VALVE ROTATING DISC

BACKGROUND OF THE INVENTION

1. Field of the Invention

The present invention relates to gate valves and more particularly to a gate valve having a fluid passageway closing disc therein with an opening in the disc supporting a fluid passageway closing plug rotated about its axis each time the gate valve is closed.

2. Description of the Prior Art

Gate valves presently in use for controlling the flow of high pressure fluids containing abrasive materials, such as sand, or the like, are usually provided with ring-like seats or sealing members surrounding the flow passageway on opposite sides of a disc slot normal to the axis of the flow passage which slidably receives a generally U-shaped disc having an aperture therein movable into and out of registration with the flow passageway for permitting and interrupting flow therethrough. My patent No. 3,871,616 discloses a gate valve of this type in which the metallic disc supports a plug member formed from ceramic material sealingly mating with like material disc seals or seats with the disc being movable between open and closed positions by a manually operated control wheel axially moving a valve stem contained by the bonnet of the gate. The ceramic plug member is rotatable within the disc but is not provided with means for rotating it about its axis. Thus the plug member normally seats against the flow passageway seals in the same position each time the gate valve is closed which in time results in wear of mating parts by the action of abrasive material in the fluid stream being controlled rather than the wearing action being distributed over the circumferential edge portions of the plug and seals as may be accomplished by rotating the plug member.

SUMMARY OF THE INVENTION

A gate valve having a body with a flow passageway therethrough is provided with a disc guide slot transversely intersecting the flow passageway for slidably receiving a disc. The body supports a seating ring coaxial with the flow passageway at the upstream and downstream sides of the disc receiving slot. A disc, formed of metallic material, is attached to the gate valve stem and is slidably positioned within the disc slot. The disc is transversely provided with an opening movable into and out of axial registration with the flow passageway by movement of the disc and a cylindrical plug member is removably supported by a aperture in the disc for sealingly mating with the adjacent surface of one of the seating rings when the disc is in flow passageway closed position. The plug member is provided with circumferentially spaced teeth successively engaging a detent and rotating the plug member, about its axis through a predetermined arc, each time the disc is moved to a flow passageway closed position.

The principal object of this invention is to provide a disc for a gate valve for controlling fluid flow of high pressure abrasive material by providing a disc having a plug formed of abrasive resistant material in which the plug is rotated about its axis through a predetermined arc each time the plug is moved to a flow passageway closed position.

DESCRIPTION OF THE PREFERRED EMBODIMENT

Figure 2:
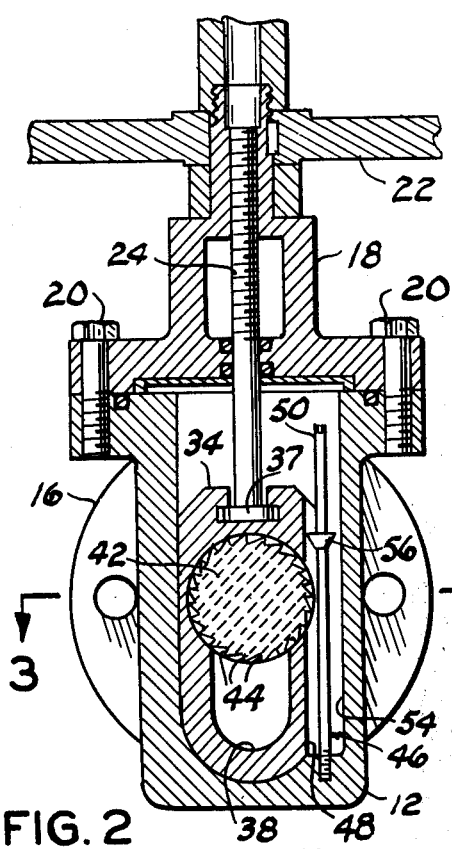
FIG. 2 is a vertical cross sectional view taken substantially along the line 2—2 of FIG. 1.
Figure 1:
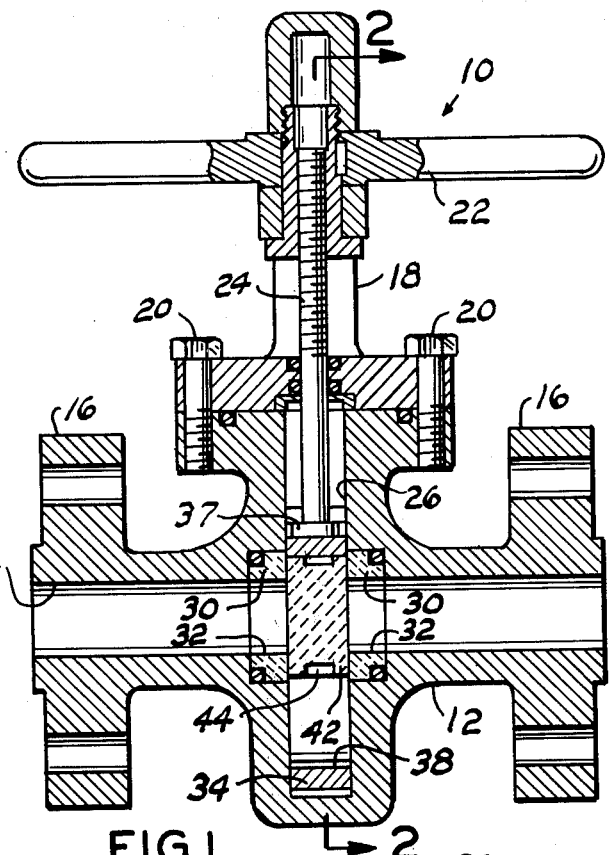
FIG. 1 is a vertical cross sectional view of a flanged end single disc rising stem gate valve in fluid passageway closed position.
Figure 3:
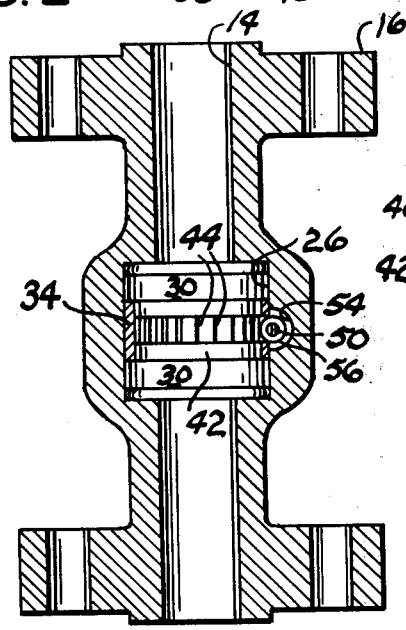
FIG. 3 is a vertical cross sectional view taken substantially along the line 3—3 of FIG. 2.

Like characters of reference designate like parts in those figures of the drawings in which they occur.

In the drawings:

The reference numeral 10 indicates the gate valve, as a whole, comprising a body 12 having a flow passageway 14 therethrough and flanged ends 16 for connecting the gate valve to adjacent ends of a conductor, such as a pipe, not shown. The gate valve is provided with a bonnet 18 secured in a conventional manner by bolts 20 to the valve body. The bonnet is provided with a hand control or gate wheel 22 threadedly engaging a valve stem 24 for axially raising and lowering the latter with respect to the body 12. The valve stem 24 is raised by manually rotating the gate wheel 22 in one direction and manual rotation of the gate wheel in the opposite direction lowers the valve stem. The body is provided with a transverse elongated U-shaped chamber or slot 26 open to the bonnet and extending beyond the lateral limits of the flow passageway and beyond the flow passageway opposite the bonnet a distance at least greater than the diameter of the flow passageway into which the stem 24 projects and which slidably receives guidingly the gate valve disc.

The body 12 is provided with a pair of ceramic ring seals or seats 30, each having a bore 32 diametrically approximately equal with respect to the flow passageway 14 and forming an intermediate portion thereof.

The reference numeral 34 indicates a gate valve disc of general U-shape dimensioned for vertical reciprocation in the valve guide slot 26 having a slot 36 in its upwardly disposed head end portion for receiving the disc moving valve stem head 37. Thus the gate valve disc 34 is moved vertically each time the valve stem 24 is raised or lowered. The depending end portion of the disc 34 is provided with an opening 38 diametrically at least equal to the diameter of the flow passageway 14. The upper end portion of the disc 34 is provided with an aperture 40, diametrically substantially equal to the diameter of the seals 30, for receiving a cylindrical ceramic plug 42, having a length equal to the thickness of the disc 34 and rotatable within the aperture 40.

The seals 30 and plug 42 are preferably formed from ceramic or other material having a hardness of forty or above as measured on the Rockwell C scale.

Figure 4:
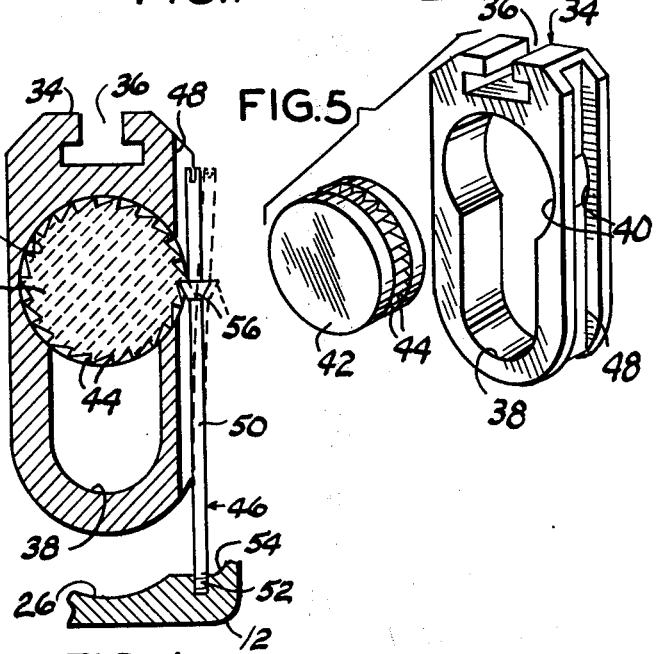
FIG. 4 is a vertical cross sectional view of the disc and plug member in plug rotating contact with the detent; and, FIG. 5 is an exploded perspective view of the disc and plug member.
Figure 5:
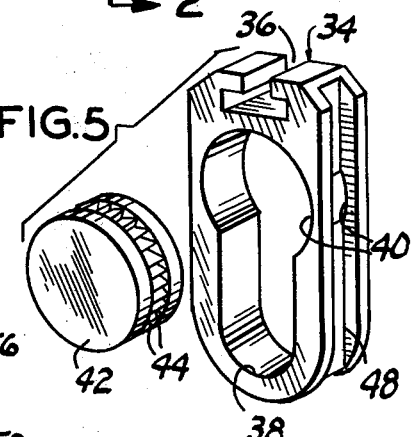

Intermediate its length, the plug member 42 is provided with a circumferential row of equally spaced teeth 44 for engaging a detent means 46. One longitudinal side of the disc 34 is provided with a groove 48, substantially U-shaped transversely and having a width substantially equal with the width of the row of teeth 44 and having a depth sufficient to subtend an arc of the circumference of the part-circular wall of the disc defining the aperture 40. Thus a peripheral arc of the plug member 42 projects into the groove 48. The detent means 46 comprises an elongated rod 50, threadedly connected at one end, as at 52, with the valve body 12 within an elongated recess 54 formed in the valve body adjacent and opening toward the position of the disc groove 48 and extending between the end limits of travel of the disc. A detent 56, substantially inverted truncated conical in shape, surrounds the rod 50 intermediate its ends and is preferably disposed so that a peripheral portion of its base surface is in position for engaging one of the plug member teeth 44 when the disc 34 is in flow passageway open position. The rod 50 is preferably formed of material capable of being deflected laterally, at one end portion, of its longitudinal axis and normally returning to a position of repose wherein its axis is parallel with the longitudinal axis of the disc 34 for the purpose of permitting the teeth 44 to contact the detent 56 and deflect the rod laterally, to its dotted line position of FIG. 4, as the disc is moved to a flow passageway open position. The downwardly converging surface of the detent 56 offers a minimum of resistance to the plug and teeth 44 when the disc is moved to a flow passageway open position. After being deflected the rod 50 then returns, to its solid line position, thus disposing the detent 56 in position to engage one of the teeth 44 when the disc 34 is moved toward the threadedly connected end of the rod 50 and a flow passageway closed position. Thus, the plug teeth 44 engage the detent 56 and the plug is rotated about its axis through a predetermined arc each time the disc 34 is moved to a flow passageway closed position.

Obviously the invention is susceptible to changes or alterations without defeating its practicability. Therefore, I do not wish to be confined to the preferred embodiment shown in the drawings and described herein.

I claim:

1. In a gate valve having a body provided with a flow passageway and having a disc receiving guide slot transversely intersecting the passageway, a valve stem having one end portion axially movable within the disc slot toward and away from the axis of the passageway by a gate wheel rotatable in opposing directions and having a pair of disc seat rings formed from material having a Rockwell scale C hardness of at least forty disposed, respectively, on the upstream and downstream sides of the disc slot coaxial with respect to the flow passageway and defining confronting seat ring surfaces respectively disposed in the planes forming the upstream and downstream sides of the slot, the improvement comprising:

a metallic disc slidable within the disc slot,
 said disc having a head portion removably secured to said one end portion of said valve stem for moving said disc and opening and closing the flow passageway,
 said disc having a transverse opening, at least equal in area to the transverse cross sectional area of the flow passageway, in its end portion opposite said disc head portion and having a transverse aperture between its head portion and the opening coaxial with the flow passageway when said disc is in valve closed position and being at least diametrically equal to the diameter of the flow passageway;
a plug formed of material having a Rockwell scale C hardness of at least forty freely received by the disc aperture and slidably interposed between said disc seat rings for coaxially registering and sealing with said disc seat ring on the downstream side of the slot and closing the flow passageway when said disc is moved to a closed position; and,
ratchet means within the gate valve body for angularly rotating said plug through a predetermined arc each time said disc is moved to a flow passageway closed position.

2. The gate valve according to claim 1 in which said disc is provided with a groove in its outer surface subtending an arc of its surface defining the aperture and said ratchet means includes:

ratchet teeth formed on the periphery of said plug and being successively disposed within the groove by angular rotation of said plug; and,
a detent secured to said gate valve body and projecting into the disc groove for engaging said ratchet teeth and angularly rotating said plug through a predetermined arc each time said disc is moved to a flow passageway closed position.

3. The gate valve according to claim 2 in which the ratchet teeth are disposed between the opposing disc seat ring seating surfaces of said plug and further including:

a rod, formed of material capable of returning to its position of repose after being deflected laterally, connecting said detent to said gate valve body.

* * * * *